(12) United States Patent
Bjugan et al.

(10) Patent No.: US 7,835,723 B2
(45) Date of Patent: Nov. 16, 2010

(54) MOBILE BANKING

(75) Inventors: Ketil Bjugan, Charlotte, NC (US);
Douglas Gerard Brown, Waxhaw, NC (US); Peter K Buchhop, Cary, IL (US)

(73) Assignee: Bank of America Corporation, Charlotte, NC (US)

( * ) Notice: Subject to any disclaimer, the term of this patent is extended or adjusted under 35 U.S.C. 154(b) by 791 days.

(21) Appl. No.: 11/670,989

(22) Filed: Feb. 4, 2007

(65) Prior Publication Data

US 2008/0189759 A1 Aug. 7, 2008

(51) Int. Cl.
*H04K 1/00* (2006.01)
(52) U.S. Cl. .................... 455/410; 455/411; 463/29; 705/18
(58) Field of Classification Search ......... 455/410–411; 463/29
See application file for complete search history.

(56) References Cited

U.S. PATENT DOCUMENTS

| | | | |
|---|---|---|---|
| 6,047,268 A * | 4/2000 | Bartoli et al. ................. | 705/35 |
| 6,430,624 B1 | 8/2002 | Jamtgaard | |
| 6,477,565 B1 | 11/2002 | Daswani | |
| 6,581,825 B1 | 6/2003 | Rickerson, Jr. | |
| 6,772,333 B1 * | 8/2004 | Brendel ....................... | 713/153 |
| 6,834,341 B1 * | 12/2004 | Bahl et al. ................... | 713/156 |
| 6,925,439 B1 | 8/2005 | Pitroda | |
| 7,054,637 B2 | 5/2006 | Weigand | |
| 2003/0097592 A1 * | 5/2003 | Adusumilli ................. | 713/201 |
| 2003/0115126 A1 | 6/2003 | Pitroda | |
| 2003/0120594 A1 | 6/2003 | Shaginaw | |
| 2004/0005895 A1 * | 1/2004 | Rollender ................... | 455/445 |
| 2004/0024867 A1 * | 2/2004 | Kjellberg .................... | 709/224 |
| 2004/0152446 A1 * | 8/2004 | Saunders et al. ............ | 455/411 |
| 2004/0267664 A1 | 12/2004 | Nam | |
| 2004/0267665 A1 | 12/2004 | Nam | |
| 2005/0033991 A1 | 2/2005 | Crane | |
| 2005/0198049 A1 * | 9/2005 | Ho et al. ..................... | 707/100 |

(Continued)

FOREIGN PATENT DOCUMENTS

EP 1083722 A2 3/2001

(Continued)

OTHER PUBLICATIONS

"Wireless Application Protocol"; downloaded from www.tml.tkk.fi/Studies/T-110.456/2005/slides/WAP-1.pdf; Jan. 20, 2007.

(Continued)

*Primary Examiner*—Lewis G West
*Assistant Examiner*—Qun Shen
(74) *Attorney, Agent, or Firm*—Michael Springs; Banner & Witcoff, Ltd

(57) ABSTRACT

Systems and methods are disclosed for identifying circumstances where end-to-end security is not available to a mobile banking customer. The user may be alerted/warned or restricted from accessing some banking services through his/her WAP-enabled mobile device if the bank server determines that end-to-end security is not available. In some instances, the bank server may access a computer data file containing a list of known end-to-end secure devices and gateways to verify the integrity of the data communication. The server may verify the integrity of the data communication using loose matching.

13 Claims, 3 Drawing Sheets

U.S. PATENT DOCUMENTS

| | | | |
|---|---|---|---|
| 2005/0220095 A1* | 10/2005 | Narayanan et al. | 370/389 |
| 2005/0247777 A1 | 11/2005 | Pitroda | |
| 2006/0245362 A1* | 11/2006 | Choyi | 370/238 |
| 2007/0211893 A1* | 9/2007 | Frosik et al. | 380/30 |
| 2008/0046616 A1* | 2/2008 | Verzunov et al. | 710/68 |

FOREIGN PATENT DOCUMENTS

| | | |
|---|---|---|
| EP | 1492068 | 12/2004 |
| EP | 1498861 | 1/2005 |
| EP | 1645149 | 4/2006 |
| EP | 1652125 | 5/2006 |
| JP | 2005122687 | 5/2005 |
| JP | 2005322196 | 11/2005 |
| WO | 2004114194 | 12/2004 |
| WO | 2004114696 | 12/2004 |
| WO | 2004114697 | 12/2004 |
| WO | 2004114698 | 12/2004 |

OTHER PUBLICATIONS

"End to End Security with WAP vBulletin v3.5.6, Jelsoft, Enterprises, Ltd., Nokia Discussion Forum"; downloaded from http://discussion.forum.nokia.com/forum/archive/index.php/t-1624.html; May 16, 2002.

"State of the Art Report"; created Nov. 1, 2002; last revision Aug. 15, 2003; downloaded from http://www.health-memory.org.

H. Wang, "Secure Wireless Payment Protocol"; downloaded from http://www.scs.carleton.ca/~kranakis/Papers/swpp.pdf; Feb. 20, 2007.

S. Itani and A. Kayssi; "Securing Mobile Banking Transactions using WAP Application-Layer Security" downloaded from; http://www.actapress.com/PaperInfo.aspx?PaperID=24837; Jan. 20, 2007.

W. Itani and A. Kayssi; "J2ME application-layer end-to-end security for m-commerce" downloaded from; http://portalacmorgcitationcfmid=972094&jmp=abstract&dl=GUIDE&dl=GUIDE&CFID=15151515&CFTOKEN=6184618#abstract; Jan. 20, 2007.

R. Crowley; "Wireless Application Protocol"; downloaded from http://misnt.indstate.edu/harper/Students/WAP/Wap.html; January 20, 2007.

D. Gavalas, et al; "Status and Trends of Wireless Web Technologies"; downloaded from http://www.actapress.com/PaperInfo.aspx?PaperID=28135; Jan. 20, 2007.

R. Howell; "WAP Security"; downloaded from http://www.perfectxml.com/Conf/Wrox/Files/howell1text.pdf; Feb. 20, 2007.

O. Kalu; Making the mobile internet: An Assessment of Two Alternative Technologies for Developing Wireless Applications; University of Luton; Sep. 2002; downloaded from http://64.233.167.104/search?q=cache:T_76m5-g2hcJ:wwwgeocities.com/obkalu/downloads/MScThesisReport.doc, Jan. 21, 2007.

WAP Forum, Wireless Application Protocol: WAP 2.0 Technical White Paper; Jan. 2002; downloaded from http://www.wapforum.org/what/WAPWhite_Paper1.pdf.

Telus Mobility; "Wireless Security Primer"; Aug. 2002: downloaded from http://www.telusmobility.com/pdf/business_solutions/security_primer.pdf.

The Wireless FAQ: "How secure is WAP with SSL and WTLS"; Last modified: Oct. 9, 2006; downloaded from http://www.thewirelessfaq.com/how_secure_is_wap_with_ssl_and_wtls, Jan. 21, 2007.

"Introduction to User Agent Profile"; version 1.1; Aug. 25, 2003; downloaded from http://sw.nokia.com/id/e6d9c5ab-8fb7-4612-9914-a92c6e194373/Introduction_to_User_Agent_Profile_v1_1_en.pdf.

"User Agent Detection and Client Device Capabilities Detection"; downloaded from http://www.developershome.com/wap/detection/detection.asp?page=intro, Jan. 21, 2007.

"Using UAProf (User Agent Profile) to Detect User Agent Types and Device Capabilities"; downloaded from www.developershome.com/wap/dectection.asp?page=uaprof. Jan. 21, 2007.

M. Toivanen, "User Agent Profiling in WAP 1.2"; Research Seminar on WAP, Department of Computer Science, University of Helsinki, Mar. 17, 2000; downloaded from http://www.cs.helsinki.fi/u/kraatika/Courses/wap00s/uaprofile.pdf.

"WAP User Agents"; downloaded from webcab.de/wapua.htm; Jan. 21, 2007.

"WAG UAProf"; Wireless Application Protocol; WAP-248-UAPROF-20011020-a; WAP Forum; Oct. 20, 2001; downloaded from http://www.wapforum.org/wap-248-uaprof-20011020-a.pdf.

"What is the difference between WAP 1.1 and WAP 1.2"; last modified Dec. 16, 2006, by atrasatti; downloaded from http://www.thewirelessfaq.com/what_is_the_difference_between_wap_1.1_and_wap_1.2, Jan. 21, 2007.

"UAProf/User Agent Profile Reference"; downloaded from http://www.developershome.com/wap/uaprofRef, Jan. 21, 2007.

"Tutorial about Detecting User Agent Types and Client Device Capabilities"; downloaded from http://www.developershome.com/wap/detection, Jan. 21, 2007.

"Multimedia Messaging Service Client Transactions; Open Mobile Alliance; OMA-WAP-MMS-CTR-V1_1-20040715-A; Continues the Technical Activities Originated in the WAP Forum"; Approved version 1.1, Jul. 15, 2004.

WebSphere Everyplace Connection Manager; Administrator's Guide, Version 5.0; (First edition Jun. 2003), International Business Machines (IBM).

HTTP/1.1: Header Field Definitions; downloaded from http://www.w3.org/Protocols/rfc2616/rfc2616-sec14.html, Jan. 25, 2007.

Bank Systems and Technology, Wachovia Offers Mobile Banking Product; downloaded from http://www.banktech.com/printableArticle.jhtml?articleID=197000238, Feb. 28, 2007.

PCT International Preliminary Report on Patentability, PCT/US2008/052802, mailed Aug. 13, 2009, 7 pages.

PCT International Search Report mailed Nov. 28, 2008, PCT/US2008/052802, 8 pages.

\* cited by examiner

MOBILE BANKING

FIELD OF THE INVENTION

Aspects of the disclosure relate to mobile banking. More specifically, aspects of the disclosure relate to security in mobile banking.

BACKGROUND

Wireless Access Protocol (WAP) was developed in 1997 by a consortium of major cell phone manufacturers and wireless technology providers such as, Nokia, Ericsson, Motorola, and Unwired Planet. WAP is a global standard that is currently available under two major versions: WAP 1.x and WAP 2.x.

In a traditional wireless communications system using WAP 1.0, a mobile device running WAP-complaint software accesses a WAP gateway through a wireless carrier (e.g., Sprint, Cingular, Verizon, etc.). The WAP-compliant gateway receives data from the mobile device in a WAP-compliant format and converts the data into a format serviceable by a standard web server (e.g., HTTP web server). For example, data in WSP and WTP format is converted to HTTP format before being sent to a web server. Data in WDP format is converted to TCP format before being sent to the web server.

For security, a WTLS protocol is used to protect the data being sent from the mobile device to the WAP gateway using encryption. Meanwhile, SSL protects the data being sent from the WAP gateway to the web server. Therefore, the WAP gateway decrypts the data and then re-encrypts the data to convert from the WTLS protocol to the SSL protocol. It is during this time that the integrity of the end-to-end security of the WAP 1.x compliant system is compromised. This situation is known as the "WAP gap."

The "WAP gap" results because WAP 1.x uses a proxy-based security architecture which lacks true end-to-end security. Although the WAP consortium resolved the "WAP gap" in WAP 2.0 and subsequent versions by designing the WAP-2.0 compliant user device to transmit data in TCP/IP format such that the WAP gateway (or WAP proxy) need not convert between varying protocol layers, there are still many WAP-1.x compliant devices on the market.

In many cases, the user of a wireless device may not be aware that his or her mobile device is not providing end-to-end security (e.g., is not WAP 2.0-compliant). In another example, a user of a wireless device that is in a roaming mode on another carrier network may not be aware that the temporary carrier is not providing end-to-end security. Furthermore, some vendors such as Phone.com and RSA provide custom WAP 1.x gateways that overcome the "WAP gap" end-to-end security integrity issue, however, an end user may not be aware of the specific WAP gateways used by its carrier and other carriers. Therefore, there is a need in the art to identify when true end-to-end security is not available to a mobile banking customer and to respond accordingly.

BRIEF SUMMARY

Aspects of the present disclosure address one or more of the issues mentioned above by disclosing a system and method for verifying end-to-end secure communication between a user device and a secure server. The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

In one embodiment in accordance with aspects of the disclosure, a method is illustrated for determining whether communication from a user device to a server is end-to-end secure. The results of such a determination may be recorded in one or more computer data files for use in verifying end-to-end secure wireless communications.

In another embodiment in accordance with aspects of the disclosure, aspects of the invention may be provided in a computer-readable medium. In yet another embodiment, a system may be provided comprising a user device, gateway, and server. The computer system may be implemented in accordance with aspects of the invention to perform methods disclosed herein. The system may include a data file storing a list of identifiers determined through, among other things, due diligence.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
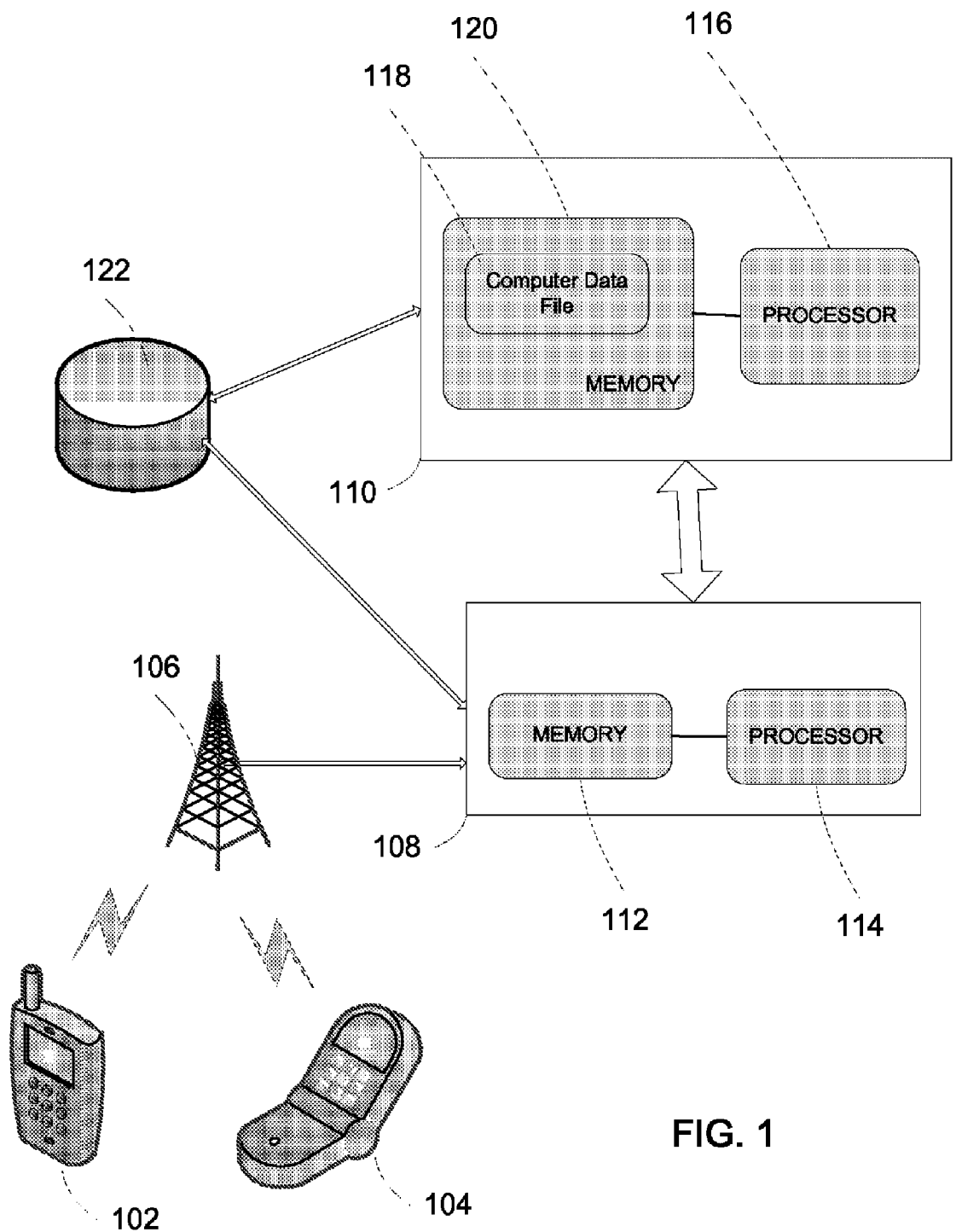
FIG. 1 depicts an illustrative operating environment for secure end-to-end wireless communication in accordance with aspects of the invention.

FIG. 1 depicts an illustrative operating environment for secure end-to-end wireless communication in accordance with aspects of the invention. A user of WAP-enabled (or other wireless protocols) devices 102, 104 may communicate with a carrier tower 106 in a wireless manner. The data communicated from the user devices 102, 104 may be transmitted to a WAP-enabled network device 108 of the carrier (e.g., Sprint, Verizon, Cingular, etc.). The WAP-enabled network device 108 may be a WAP gateway with a memory 112 storing computer-readable instructions and a processor 114 for executing the computer-readable instructions. In some embodiments, the WAP gateway 108 may be WAP 2.0 compliant or WAP 1.x compliant. The data communicated to the WAP gateway 108 from the user device 102, 104 may be converted into an HTTP request understandable by the web server 110. In some cases this results in a "WAP gap" that results in a compromise of end-to-end security. The server 110 may be comprised of a memory 120 storing computer-readable instructions and a processor 116 for executing the computer-readable instructions in accordance with aspects of the invention. The memory 120 may also store a computer data file 118 that stores information about approved devices and/or resources (e.g., IP addresses of approved gateways). In addition, a repository 122 for user agent profiles in XML format may be provided for access by the server 110 and/or WAP gateway 108. In some cases, mobile phone manufacturers may maintain the repository 122 These and other aspects of the disclosure will become apparent to one skilled in the art after review of the entirety disclosed herein.

Although the server 110 has been described as a web server or Internet-accessible server, one skilled in the art will appreciate that the server 110 is not limited to a single machine or device. Rather, the term server 110 refers to any system of computers and/or devices (e.g., firewalls, routers, caching systems, proxy servers, etc.) that may be used to provide access to services and features available for access by users. As such, different reference to the server 110 performing particular steps does not require that the same machine/device perform all the steps.

Figure 2:
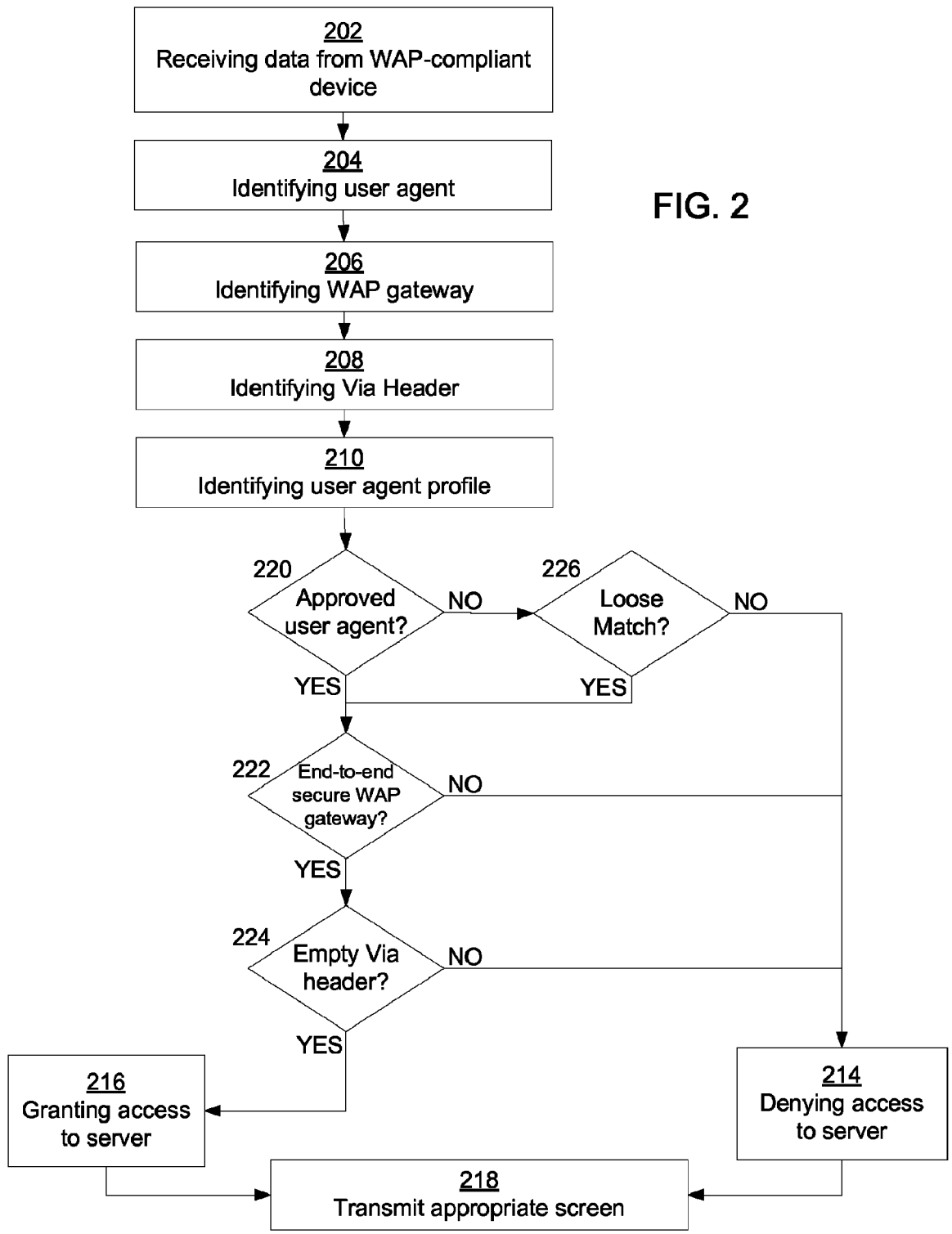
FIG. 2 shows a flowchart illustrating a method for verifying end-to-end secure communication from a user device to a web server in a mobile banking application in accordance with aspects of the invention.

FIG. 2 shows a flowchart illustrating a method for verifying end-to-end secure communication from a user device to a web server in a mobile banking application in accordance with aspects of the invention. A web (e.g., Internet-accessible) server may receive (in step 202) data from a device comprising WAP-compliant software (e.g., a WAP gateway). The data may include a device's request for access to the web server. For example, the web server may be a banking website that offers a user a variety of banking services, including, but not limited to money transfer, balance check, bill pay, and others. The illustrated method may permit a user with a WAP-enabled mobile phone to access these services from anywhere. The mobile phone may contain a WAP-compliant browser that permits the user to visit the banking website. The user device (e.g., mobile phone) may send data packetized with header information to the web server through the WAP gateway.

For example, a user may indicate to the browser that he/she wishes to visit the website of a particular bank. As a matter of customer security, the bank may wish to prevent/restrict users from accessing the bank website through an insecure communication channel. In the wireless environment there may be an especially greater risk that an unknowing user has his/her private, confidential information stolen/viewed by others. Therefore, the bank may wish to verify that a communication channel from a user's device 102, 104 to the bank's server 110 (e.g., HTTP server) is end-to-end secure before permitting full access to the bank's services.

In step 204, the server 110 may identify a value of the user agent header (e.g., a first identifier) corresponding to the user device 102, 104. The user agent header is one of many standard headers in the well known HTTP protocol. The value of the user agent header is based on the vendor (e.g., Nokia, Motorola, etc.), the model (e.g., Nokia 8100, Motorola Razor, etc.), and other factors, such as the firmware installed on the mobile device. In accordance with aspects of the invention, the user agent header value may be compared to approved user agent header values stored in a file (e.g., computer data file 118 on the server 110). Thus, the server can determine whether a particular user device is capable or incapable of providing end-to-end security.

In step 206, the server 110 may identify a second identifier (e.g., IP address) corresponding to network device 108 (e.g., WAP-compliant gateway). The second identifier may be present in one of many standard headers in the well known HTTP protocol. The server 110 may identify the IP address of the WAP-complaint gateway in the header information associated with the data sent from the network device 108 to the web server 110. Although the WAP version of the WAP-compliant gateway 108 cannot be ascertained from standard HTTP headers (e.g., user agent header), the IP address of the gateway (e.g., network device 108) may be identified. In accordance with aspects of the invention, the IP address may be compared to approved IP address values associated with approved carriers (e.g., Sprint, Verizon, etc.) stored in a file (e.g., computer data file 118 on the server 110). Thus, the server can determine whether a particular network device corresponding to an IP address is capable or incapable of providing end-to-end security.

Through due diligence (e.g., by investigating mobile carrier's networks and devices, querying the open source community, subscribing to paid services that provide the relevant data), the IP address of WAP 2.0 compliant network devices may be identified. WAP 2.0 compliant software and devices are end-to-end secure because the "WAP gap" is eliminated. However, earlier version of WAP are not automatically end-to-end secure. In some instances, earlier versions of WAP may be made end-to-end secure using various techniques such as tunneling or others. Since WAP 2.0 gateways are sometimes backwards compatible for use with WAP 1.x user agent devices, some amount of due diligence may be useful in determining whether a WAP 2.0 gateway provides end-to-end security in all instances. The results of the due diligence may be recorded in a computer data file 118 on the server 110. The computer data file 118 may be used in determining whether the data from the mobile device 102, 104 to the server 110 (through the network device 108) is wirelessly end-to-end secure. For example, a network device (e.g., WAP gateway) is not end-to-end secure if the network device 108 decrypts the data (i.e., data does not include the header portion of the communication) received from the user's mobile device 102, 104 before sending it on to the server 110. As such, the computer data file 118 may contain a list of the IP address of those network devices that are capable of end-to-end secure communication. Alternatively, the computer data file 118 may contain a list of those that IP addresses (or other identifier) with an indication of whether it is end-to-end secure or not.

If some examples, the user device 102, 104 may be in roaming mode when transmitting data to the server 110. In such instances there is an increased risk that the data communication channel may be routed through an insecure carrier. The Internet protocol (IP) address of the WAP gateway may be compared to a list of approved WAP gateway IP addresses stored in a computer data file 118 on the server 110. The list of approved IP addresses may have undergone additional due diligence to confirm that data being sent by mobile devices using the gateway in roaming mode (e.g., when they are away from their preferred/default carrier) is end-to-end secure.

In step 208, the server may determine whether a value of a "via" header is present in the data sent to the server 110. The "via" header is a standard HTTP header. If the "via" header contains a value (i.e., it is not empty), then the communication channel may not be end-to-end secure.

Furthermore, other approved resources may be stored in a computer data file 118 in the memory 120 of the server 110. For example, approved user agent header values may be stored in the file. These user agent header values may list those devices that are approved for permitting secure end-to-end communication. Similarly, known end-to-end secure user devices may be listed in the computer data file by their user agent header values. In some embodiments, the computer data file 118 may be in extensible markup language (XML) format or any other format.

In some later versions of WAP 1.x, a repository 122 may store user agent profiles (UAProf) for user devices. A locator (e.g., an uniform resource locater URL) may be provided in the header of the communication data to indicate the location of the UAProf. The WAP gateway 108 or a web server 110 may use this locator to retrieve the UAProf. The UAProf is a publicly-available XML file corresponding to the user's mobile device 102, 104 that is stored in a repository 122. In some embodiments in accordance with the invention, the server 110 may identify (in step 210) the values of the model attribute and vendor attribute in the retrieved UAProf. In other embodiments, the server 110 may also identify (in step 210) the value of the version header corresponding to the UAProf. The server 110 may use these values, among other things, to determine whether the user device is one that is capable of providing end-to-end security.

In accordance with aspects of the invention, if: (1) the value of the user agent header matches any of a list of approved user agent header values (in step 220), (2) the IP address of the WAP gateway matches any of a list of approved IP addresses (in step 222), and (3) the value of the "via" header associated with the data is empty (in step 224); then the server 110 may transmit a response to the request for access to the server 110. The response transmitted may include an indication that the request for access to the server is granted (in step 216). For example, in step 218, the information transmitted from the server 110 may correspond to a login screen for the banking website. The user may be presented with information corresponding to a login screen display on the mobile device 102, 104 requesting username and password. On the other hand, if the server 110 determines that end-to-end security is unavailable for the particular communication, the request for access to the server may be denied (in step 214). In such a case, the user may simply be unable to view anything when attempting to view the bank's website on the mobile device 102, 104. Alternatively, the bank may transmit information that corresponds to a screen display indicating to the user that access to the site was denied for a particular reason. In an alernative embodiment, the user may be provided with an alert/warning, but may be allowed to continue with the communication even though the data transfer is unsecure.

In accordance with aspects of the invention, even if the value of the user agent header does not exactly match any of a list of approved user agent header values, the server 110 may attempt to identify a loose match (in step 226). A portion (e.g., subsegment) of the value of the user agent header may be identified and compared to a list of approved user agent header values. If the identified subsegment matches any portion of any of the values in the list, a loose match is found to exist. So long as the subsegment is greater than a predetermined threshold size (e.g., five characters long), the server 110 determines that a loose match exists. The server 110 reacts to the finding of a loose match the same way it would to an exact match. At least one reason for this is because different user mobile devices may have varying user agent header values, but still correspond to essentially the same end-to-end secure systems. Therefore, at least one advantage of a loose matching technique is the ability to identify a greater number of end-to-end secure user devices given a list of approved values.

If a loose match is not found, the size of the subsegment is reduced by a predetermined amount (e.g., one character) and again loosely compared with the list of values. This repetitive process continues so long as the subsegment (e.g., portion) is greater than the predetermined threshold size. In one embodiment, the subsegment is reduced in size by eliminating characters from the end (i.e., right side) of the subsegment until the predetermined threshold size is met. At least one benefit of this approach is that ensures a higher probability that the loose match is a reliable indication that a match exists.

Likewise, in some embodiments, the value of the model attribute and vendor attribute may be retrieved from the UAProf. In such embodiments, the value of the model attribute may be loosely compared to a list of model values; and the value of the vendor attribute may be loosely compared to a list of vendor values. The manner of loosely matching these identifier values is similar to the techniques described herein.

Although aspects of the invention have been described as comparing an identified value (e.g., IP address, model attribute, vendor attribute, user agent header value) with a list of approved values, one skilled in the art will appreciate that the list may be comprised of values with an indication of whether that value is approved or not. As such, in some embodiments, the list may be include approved values, unapproved values, both, or just one. The step of comparing to identify matches is adjusted accordingly.

Furthermore, although aspects of the invention have been described with steps 220, 222, and 224, in some embodiments, one or more of these may not be required. For example, with Palm™ mobile devices it may be well known that network devices of all carriers are end-to-end secure. Therefore, after determining that the user's mobile device 102, 104 is such a device, step 222 may be omitted. Similarly, in other embodiments, one or more of the aforementioned steps may be eliminated or adjusted.

Figure 3:
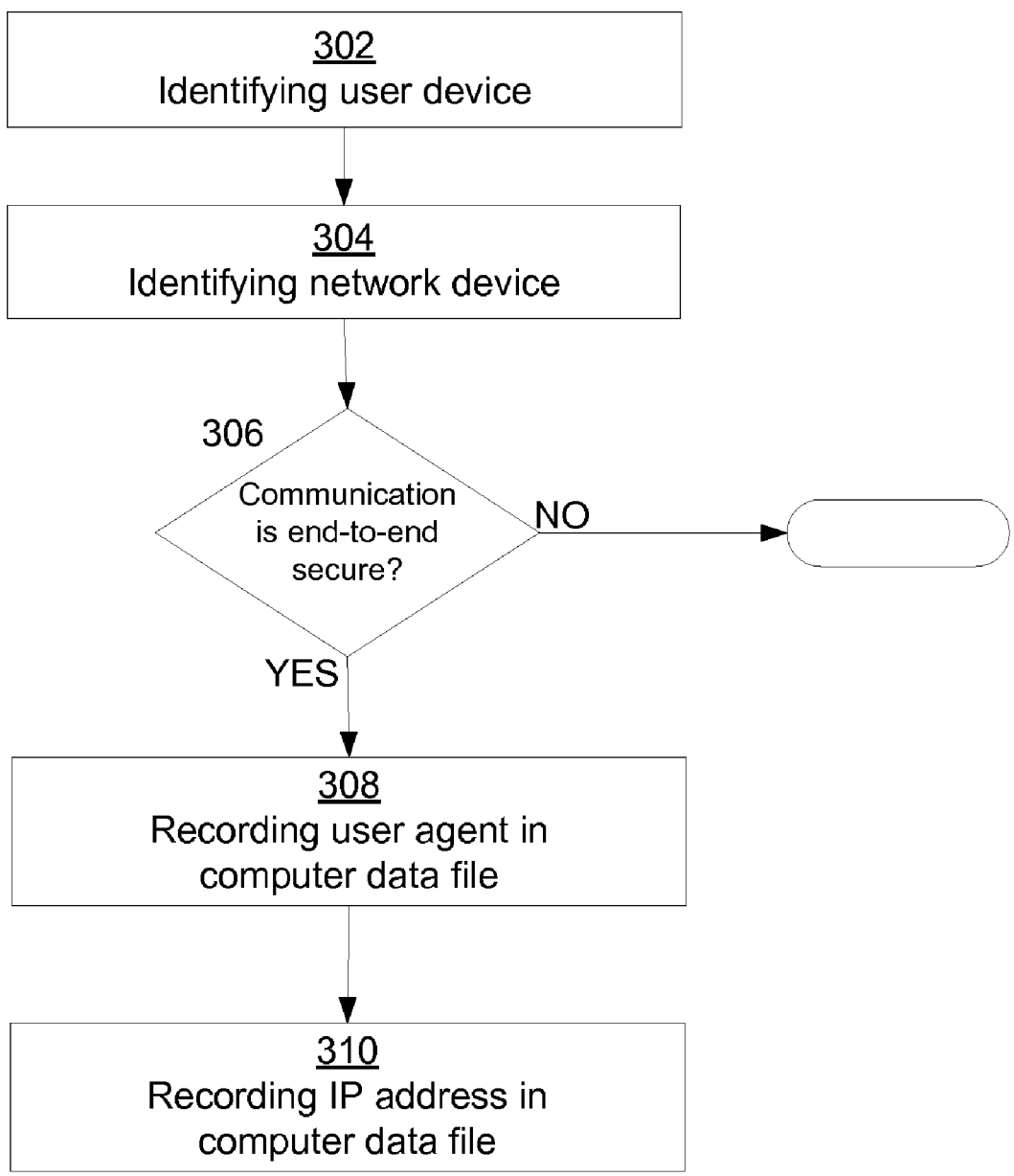
FIG. 3 shows a flowchart illustrating a method for determining whether communication from a user device to a server is end-to-end secure in accordance with aspects of the invention.

FIG. 3 shows a flowchart illustrating a method for determining whether communication from a user device to a server is end-to-end secure in accordance with aspects of the invention. In step 302, a user device may be identified by its user agent header value and/or other information. The user agent profile may also be used to identify the user device. In some embodiments, the model attribute and vendor attribute of the user agent profile may be used to identify a user device. The user agent profile may also comprise other information that may be useful in identifying or characterizing the user device, such as WAP version.

In step 304, the network device may be identified by its WAP gateway software and/or WAP version compliance. In some instances, such information may require due diligence in cooperation with a network carrier. In addition, the IP address of the network device (e.g., WAP gateway) may be used to identify the network device. In addition, information identifying the network device 108 may be obtained through other techniques. For example, services exist to monitor and provide the latest identification information for WAP-complaint systems, such as user agent header values that correspond to WAP 2.0-compliant devices. In addition, some of the information may be available through various sources in the open source community or the Internet.

In step 306, the information identified about user devices 102, 104 and network devices 108 may be gathered and grouped. Through due diligence, those user devices, network devices, and/or combinations of them that provide a secure end-to-end communication channel for data originating from the user device through the network device and to the server are determined. For example, if a network device needs to decrypt the encrypted data sent from a user device before re-encrypting it when sending it to a server, then the network device is not part of an end-to-end secure communication channel. Meanwhile, in another embodiment, a WAP 2.0-complaint gateway may be backwards compatible. Thus, when communicating with a WAP 2.0-compliant user device, the data communicated may be end-to-end secure. However, when communicating with a WAP 1.x-complaint user device, the data communicated may no longer be end-to-end secure. Various aspects of the invention address this and other drawbacks of the prior art.

In step 308, the user agent (and/or values of attributes of the user agent profile, or other identifying information) may be recorded in a computer data file 118 for those user devices that are end-to-end secure. Similarly, in step 310, the IP address (or other identifying information) may be recorded in a computer data file 118 for those network devices that are end-to-end secure. In some embodiments, the aforementioned information may be recorded in two separate files. Alternatively, the aforementioned information may be recorded as part of a single file. The computer data file may be in text format, extensible markup language (XML) format, or any other format that may be apparent to one skilled in the art after reviewing the disclosure herein.

In accordance with aspects of the invention, due diligence may reveal that data communication from a particular user device is end-to-end secure even when the user device is on his/her own carrier network. However, in roaming mode, the user's communications from the particular device is no longer end-to-end secure. Therefore, in some embodiments, the "via" header of the header information associated with the data communicated to a server 110 may be analyzed. If the "via" header is not empty (i.e., not absent), then the integrity of the communication may be less than end-to-end secure.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. For example, a computer-readable medium storing instructions to cause a processor to perform methods in accordance with aspects of the disclosure is contemplated.

In addition, various signals representing data or events as described herein may be transferred between a source and a destination in the form of electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method for verifying end-to-end secure wireless communication from a user device to a server, comprising:
   receiving a data from the user device comprising software compliant with a wireless protocol, the data relating to a request for access to the server;
   identifying a value of a first identifier corresponding to the user device;
   identifying a value of a second identifier corresponding to a network device;
   determining whether the data is end-to-end secure from the user device to the server, where the data travels through the network device before arriving at the server; and
   transmitting a response to the request, where if the data is end-to-end secure, then the response includes an indication that the request for access to the server is granted, else the response includes an indication that the request for access to the server is denied;
   where the determining whether the data is end-to-end secure includes comparing the value of the first identifier to a first list of approved values, and comparing the value of the second identifier to a second list of approved values; and
   where the comparing the value of the first identifier includes:
      comparing the value of the first identifier with the first list of approved values to determine if an exact match exists;
      if the exact match does not exist, then identifying a portion of the value of the first identifier and comparing the portion with the first list of approved values to determine if a loose match exists; and
      for each determination where a loose match does not exist and the portion is greater than a predetermined threshold size, reducing the portion in size by a predetermined amount until the loose match exists.

2. The method of claim 1, where the data is not end-to-end secure if the data is decrypted by the network device, and the network device is a WAP-compliant gateway, and the first identifier comprises a user agent header corresponding to the user device comprising WAP-compliant software, and the value of the second identifier comprises an IP address of the network device.

3. The method of claim 1, where the determining whether the data is end-to-end secure includes determining whether a value of a via header is present in the request for access to the server.

4. The method of claim 1, where the predetermined amount is one character, and the predetermined threshold size is five characters.

5. The method of claim 1, where the first list of approved values comprises a list of user agent header values corresponding to user devices comprising WAP-compliant software that communicates the data to the server in an end-to-end secure manner.

6. The method of claim 2, where the second list of approved values comprises a list of IP addresses of network devices that do not decrypt the data when the data travels through the network device.

7. The method of claim 6, where the data does not include a header portion of the communication from the user device to the server.

8. The method of claim 1, where the first identifier is a user agent profile corresponding to the user device, and the value of the first identifier comprises:
   a value of a model attribute corresponding to the user agent profile;
   a value of a vendor attribute corresponding to the user agent profile; and
   a value of a version header corresponding to the user agent profile.

9. The method of claim 8, where comparing the value of the first identifier to the first list of approved values comprises:
   comparing at least a part of the value of the model attribute to a list of approved model values; and
   comparing at least a part of the value of the vendor attribute to a list of approved vendor values.

10. The method of claim 1, further comprising, if the request for access to the server is granted, then the response to the request comprising information corresponding to a login screen.

11. A system for verifying end-to-end secure wireless data transmission from a user device comprising a software compliant with a wireless protocol to a server, where the data transmission travels through a gateway configured to receive the data transmission from the user device, the system comprising:
   the server comprising memory storing computer-readable instructions that when executed by a processor of the server cause the server to perform a method comprising:

receiving the data transmission;
identifying a value of a first identifier corresponding to the user device;
identifying a value of a second identifier corresponding to the gateway; and
determining whether the data transmission is end-to-end secure from the user device to the server, including comparing the value of the first identifier to a first list of approved values, and comparing the value of the second identifier to a second list of approved values;
where the comparing the value of the first identifier includes:
   comparing the value of the first identifier with the first list of approved values to determine that an exact match does not exist;
   identifying a portion of the value of the first identifier and comparing the portion with the first list of approved values to determine that a loose match does not exist; and
   reducing the portion in size by a predetermined amount and comparing the reduced portion of the first identifier with the first list of approved values to determine that a loose match does exist.

12. The system of claim 11, where the wireless protocol is WAP and the gateway is a WAP-compliant gateway, the system further comprising:
a data file accessible to the processor of the server, the data file comprising IP addresses of WAP-compliant gateways that are approved for permitting end-to-end secure communication, and approved model values and approved vendor values that permit end-to-end secure communication.

13. The system of claim 11, wherein the comparing the value of the first identifier includes:
for each comparison of the first identifier where a loose match does not exist and the portion is greater than a predetermined threshold size, reducing the portion in size by a predetermined amount and then comparing the reduced portion of the first identifier with the first list of approved values.

\* \* \* \* \*